United States Patent
Kouda et al.

(10) Patent No.: US 7,054,728 B2
(45) Date of Patent: May 30, 2006

(54) REWRITE CONTROL APPARATUS FOR ONBOARD PROGRAM

(75) Inventors: Toshihiko Kouda, Sagamihara (JP); Yoshihiko Nakakoji, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 195 days.

(21) Appl. No.: 10/732,851

(22) Filed: Dec. 9, 2003

(65) Prior Publication Data

US 2004/0122537 A1  Jun. 24, 2004

(30) Foreign Application Priority Data

Dec. 19, 2002 (JP) ............................. 2002-368595
Dec. 19, 2002 (JP) ............................. 2002-368596
Dec. 19, 2002 (JP) ............................. 2002-368598

(51) Int. Cl.
 *G06F 7/00* (2006.01)
(52) U.S. Cl. ......................................... 701/35; 701/33
(58) Field of Classification Search ................. 701/29, 701/30, 35, 36, 31, 33; 700/1; 709/217
See application file for complete search history.

(56) References Cited

U.S. PATENT DOCUMENTS 5,479,157 A * 12/1995 Suman et al. .............. 340/5.28
6,397,282 B1 * 5/2002 Hashimoto et al. ......... 710/260
2004/0162907 A1   8/2004 Kouda

FOREIGN PATENT DOCUMENTS

JP    10-212739 A   8/1998

* cited by examiner

Primary Examiner—Yonel Beaulieu
(74) Attorney, Agent, or Firm—Frishauf, Holtz, Goodman & Chick, P.C.

(57) ABSTRACT

A rewrite control apparatus capable of saving data which should not be reset, and rewriting a program of a large capacity on a memory of a small capacity. For this purpose, a data area (23b) for storing vehicle condition data is provided in a storage medium (23) of an onboard controller (35). When rewriting an onboard program, the apparatus writes the vehicle condition data into a storage area (23a) different from the data area, or a storage medium different from the storage medium (23) and save it, and executes the rewrite, and after finishing the rewrite, it writes the saved vehicle condition data back into the data area.

19 Claims, 9 Drawing Sheets

REWRITE CONTROL APPARATUS FOR ONBOARD PROGRAM

TECHNICAL FIELD

The present invention relates to an apparatus for controlling rewrite of an onboard program.

BACKGROUND ART

The construction equipment developed in recent years is loaded with various controllers such as controllers for collecting information of the vehicle conditions (hereinafter, vehicle condition data) such as the present position of the vehicle, the clocked value of the service meter (cumulative operating time), the past history of the errors which occurred in the vehicle body, the past history of the error codes which occurred in the vehicle body, key switch information of whether or not the key switch is on at present (in the ACC position), the battery terminal voltage information of the present terminal voltage of the battery, and the start lock information of whether the start lock is valid or invalid, and the time zone of the start lock which is set at present. A CPU is provided in such an onboard controller, and executes arithmetic operation processing in accordance with the onboard program stored in the EEPROM (electrically erasable ROM) such as a flash memory and performs the processing of collecting the vehicle condition data and transmitting and receiving to and from an outside. For example, the onboard controller and the external server are communicably connected via the communication means such as the Internet, and the vehicle condition data collected in the onboard controller is transmitted to the server. Alternatively, a serviceman visits the construction equipment, connects a personal computer to the onboard controller and takes the vehicle condition data into the personal computer.

When the onboard program is upgraded, and when the threshold values and the like to create the error code for each vehicle and to determine an abnormality such as an error for each vehicle are desired to be changed, it is necessary to rewrite the old onboard program stored in the flash memory to a new onboard program.

Patent document 1 (Japanese Patent Laid-open No. 10-212739) describes providing of a controller for collecting its operation data and providing of a monitoring device having the function as a server at a remote site, concerning construction equipment. The operation data collecting controller and monitoring device are connected by a communication device, and the operation data processing program in the operation data collecting controller is rewritten in response to a demand from the monitoring device. Namely, when a new operation data processing program is sent from the monitoring device, a rewrite control program is started on the ROM of the operation data collecting controller in the construction equipment, rewrite processing is started, and the new operation data processing program is temporarily stored in a RAM. Thereafter, the new operation data processing program is transferred to an EEPROM from the RAM, and the system control right is transferred to the new operation data processing program.

Among the vehicle condition data collected in the construction equipment, the clocked value of the service meter (cumulative operating time), the past history of the errors which occurred in the vehicle body and the like are the data with continuity which should not be reset on the rewrite processing. The RAM, which is an internal memory of the onboard controller, has a small capacity in many cases. The RAM is designed with allowance given to the date capacity, but the code amount increases by the addition of the functions and the like thereafter, and therefore the capacity usable as the work area and temporary area in the RAM becomes smaller following the addition of the functions. Consequently, when the onboard program is rewritten into a new onboard program, the new onboard program is temporarily stored in the work area of the RAM, but due to insufficiency of the free space of the work area, there arises the fear that the onboard program of a large size cannot be reliably buffered in the work area of the RAM.

In this respect, Patent document 1 describes storing a new operation data processing program temporarily in the RAM, but it does not describe how the operation data with continuity existing on the same RAM is saved on the RAM in this situation.

During the normal operation, the operation data collection controller in the construction equipment collects the operation data and processes this in accordance with the operation data processing program, and transmits the processed operation data to the monitoring device in response to the demand from the monitoring device. At the time of rewrite, the new operation data processing program is transmitted from the monitoring device to the construction equipment, and the old operation data processing program is rewritten to the new operation data processing program in the operation data collection controller in the construction equipment.

A communication abnormality or hand-up sometimes occurs halfway through remotely rewriting the onboard program in the construction equipment from the server (monitoring device) in a remote site. When an abnormality occurs during the rewrite processing of the onboard program like this, the onboard program is not started thereafter and the onboard controller itself does not function, thus causing the fear that collection of the vehicle condition data becomes impossible during the normal operation. Especially when the rewrite processing is remotely performed from a remote site, a serviceman has to visit the construction equipment from the remote site to replace or repair the onboard controller every time a communication abnormality and hang-up occur. Due to this, operation efficiency of the construction equipment is sharply reduced, and a large number of workers and man hours and a lot of time are required for recovery.

The data amount of the onboard program is large and several hundreds kiro-bytes, and therefore when the onboard program is transmitted to a large number of units of construction equipment as the targets from the server (monitoring device), the communication path becomes so busy that it requires a long time to perform the rewrite processing. In such a case, the communication path is occupied by communication for the rewrite processing, and there arises the fear that the communication for the normal operation processing is suspended for a long time. In this respect, Patent document 1 has no description of the indication of the problem of the communication path being occupied for the rewrite processing, or the measures to avoid this.

If there is any abnormality such as a detect such as a loss in the element such as the RAM in the onboard controller, the onboard controller itself does not function halfway through the rewriting of the onboard program in the construction equipment remotely from the server (monitoring device) in the remote site, and collection of the vehicle condition data becomes impossible at the time of the normal operation. Especially, the onboard controller includes the function of outputting the start lock releasing command to the start lock circuit in accordance with the onboard program, and if the onboard controller does not function, the start lock cannot be released. However, since the construction equipment is sometimes operated in the harsh environments, the start lock release is indispensable. If the onboard controller does not function in the start lock state, it cannot move unless a serviceman visits the site and replaces the onboard controller or the like, and therefore availability is sharply reduced. Further, the construction equipment is frequently operated in remote corners of a country, and depending on the place in which the construction equipment is operated, there arises the fear that the communication is disconnected and the rewrite processing is not finished normally.

In this respect, the above-described Patent document 1 has no description concerning avoidance of the aforementioned problems in advance on the occasion of performing the rewrite processing.

SUMMARY OF THE INVENTION

The present invention is made in view of the above-described circumstances, and its object is to make it possible to reliably save the data which should not be reset on rewriting an onboard program, and to rewrite the onboard program of a large capacity on a memory of a small capacity. Another object of the present invention is to prevent reduction in operation efficiency even when an abnormality occurs during rewrite processing and to avoid long-time occupancy by rewrite processing communication. Still another object is to avoid the situation in which rewrite processing is not finished normally in advance.

A first aspect of a rewrite control apparatus for an onboard program according to the present invention includes: an onboard controller provided in a vehicle, a storage medium of an information collection controller of the onboard controller is provided with a data area for storing vehicle condition data; when a command to rewrite the onboard program into a new onboard program is given, the rewrite control apparatus writes and saves the vehicle condition data stored in the data area into a storage area which is in the storage medium and is different from the data area, or into a storage medium different from the storage medium, and executes rewrite processing of rewriting the onboard program into the new onboard program; and when the rewrite processing is finished, the rewrite control apparatus performs processing of writing the saved vehicle condition data back into the data area. Further, in the rewrite control apparatus: the storage medium different from the storage medium may be at least any one of a storage medium provided in the information collection controller separately from the storage medium, a storage medium which is inside the vehicle and provided outside the information collection controller, and a storage medium in a server which is outside the vehicle and communicably connected to the onboard controller by communication means.

According to the above constitution, the vehicle condition data which should not be reset and is desired to be inherited on the occasion of rewrite processing is saved in the different storage medium at the time of rewriting processing, and is written back into the original data area after finishing of the rewrite processing, and therefore the vehicle condition data can be reliably saved on the memory of the information collection controller.

In the rewrite control apparatus: while the vehicle condition data is saved, the data area may be used as a buffer area for the onboard program. According to this constitution, the onboard program of a large capacity can be reliably buffered on the memory of a small capacity in the information collection controller, and the rewrite processing can be reliably performed.

A second aspect of the rewrite control apparatus for an onboard program according to the present invention includes: severs; an onboard controller provided in a vehicle; and communication means for communicably connecting the servers and the onboard controller; and has i) a normal operation mode for transmitting and receiving a vehicle condition between the servers and the onboard controller and ii) a rewrite mode for rewriting the onboard program of the onboard controller into a new onboard program transmitted from the servers, which are switchable in a communication state; and when an onboard program rewrite command is issued from the servers, the rewrite control apparatus switches from the normal operation mode to the rewrite mode, and when a command to switch to the normal operation mode is transmitted during the rewrite mode, the rewrite control apparatus switches from the rewrite mode to the normal operation mode. Further, in the rewrite control apparatus: the switching command may be based on a signal from timer means or a logout signal.

According to the above constitution, even when a communication abnormality or an abnormality such as hand-up occurs halfway through the rewrite processing, the old onboard program can be reliably started to keep the function of the information collection controller. Consequently, normal operation processing can be reliably performed, and reduction in operation efficiency caused as a result that the information collection controller does not function can be prevented. Further, since the rewrite mode is shifted to the normal operation mode by the switch command, the communication path is prevented from being occupied for a long time by communication for the rewrite processing, and communication for normal operation processing is secured to make it possible to prevent the normal operation processing being hindered.

A third aspect of the rewrite control apparatus for an onboard program according to the present invention includes: a server, an onboard controller provided in a vehicle, and communication means for communicably connecting the server and the onboard controller, and when the server is to execute rewrite processing of an onboard program of the onboard controller via the communication means, the server determines whether it should execute the rewrite processing of the onboard program or not by referring to a memory content of the onboard controller. In the rewrite control apparatus: the memory content of the onboard controller may include at least any one of the onboard program and vehicle condition data. In the rewrite control apparatus: when the server determines whether it should execute the rewrite processing of the onboard program or not, the server may compare the memory content of the onboard controller and a memory content of a master file.

Further, in the rewrite control apparatus: when the server determines whether it should execute the rewrite processing of the onboard program or not, the server may check the vehicle condition data of the vehicle, and when a content thereof indicates a state in which start of the vehicle is locked, the server may not execute the rewrite processing. In the rewrite control apparatus, when the server determines whether it should execute the rewrite processing of the onboard program or not, the server checks the vehicle condition data of the vehicle, and when a content thereof indicates that the vehicle is located at a specified position, the server executes the rewrite processing.

The above configuration is applied to the case in which the onboard program in the vehicle is remotely rewritten via the communication means in response to the demand from the server. According to the above configuration, on the occasion of rewrite processing, the vehicle condition data is previously checked, the situation in which the rewrite processing is not finished normally and the situation in which the rewrite processing falls into a dangerous state can be avoided in advance. Especially by comparing the memory contents of the onboard controller and the master file, conformity and inconformity of the data in the vehicle and the data in the master file can be verified, and the processing thereafter can be properly determined in accordance with the result. Since rewrite processing is not executed when the vehicle is in the start lock state, it is possible to avoid the situation in which the vehicle becomes immobile as it is remaining in the start lock state, and it is possible to avoid further reduction in availability in advance.

BRIEF DESCRIPTION OF THE DRAWINGS

FIG. 3A to FIG. 3F are diagrams showing state transitions of a flash memory and a RAM in the embodiment.

FIG. 5A to FIG. 5D are diagrams showing state transitions of the flash memory and the RAM when the data is saved in the embodiment.

BEST MODE FOR CARRYING OUT THE INVENTION

Figure 1:
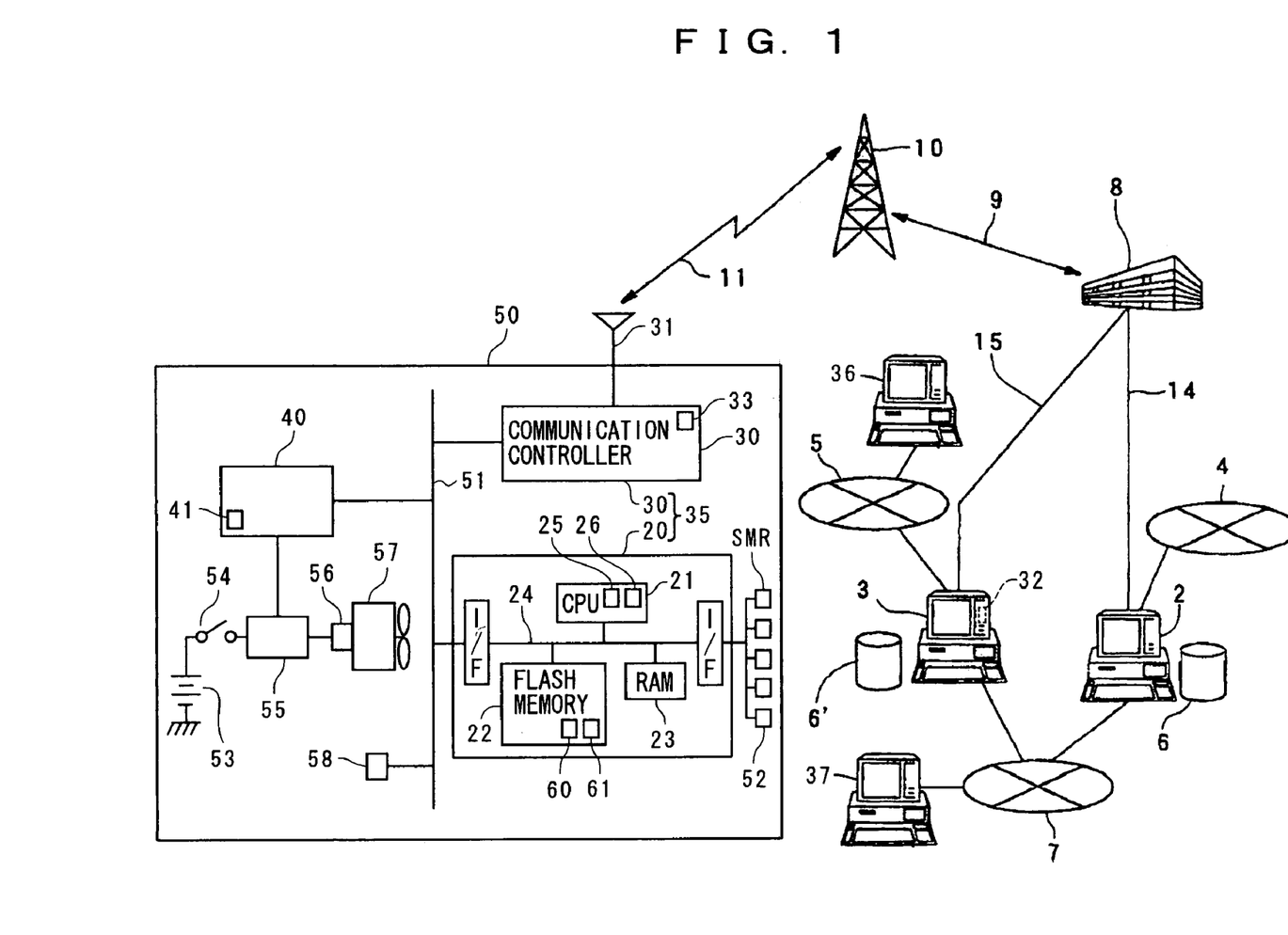
FIG. 1 is a diagram showing an entire configuration of a system of an embodiment according to the present invention.

A preferred embodiment according to the present invention will be described in detail below in accordance with the attached drawings. FIG. 1 shows an entire apparatus configuration of the embodiment. In the following embodiment, construction equipment 50 is assumed to be a vehicle, and a case in which an onboard program 60 in the construction equipment 50 is remotely rewritten in response to a demand from a rewrite-only server 3 is assumed.

In a system of this embodiment, the construction equipment 50 is connected to a normal operation server 2 and the rewrite-only server 3 respectively to be capable of transmitting/receiving to/from each other by communication means (radio communication 11, an antenna 10, a private line 9, a ground wave base station 8, private lines 14 and 15). The normal operation server 2 is located in an intranet 4, and connected to the Internet 7. As a result, the normal operation server 2 functions as a server of each client terminal of the Internet 7 and the intranet 4. The normal operation server 2 is given an IP address "ID1" being an ID (server identification ID) for identifying itself in a network. The construction equipment 50 is loaded with a communication terminal (communication controller 30) communicable with the normal operation server 2, and this communication terminal is given an IP address "ID3" corresponding to the server identification ID "ID1" (see FIG. 10).

The rewrite-only server 3 is located in an intranet 5, and is connected to the Internet 7. As a result, the rewrite-only server 3 functions as a server of each client terminal of the Internet 7 and the intranet 5. The rewrite-only server 3 is given an IP address "ID2" being the ID (server identification ID) for identifying itself in a network. The construction equipment 50 is loaded with a communication terminal (communication controller 30) communicable with the rewrite-only server 3, and this communication terminal is given an IP address "ID4" corresponding to the server identification ID "ID2" (see FIG. 10).

Figure 10:
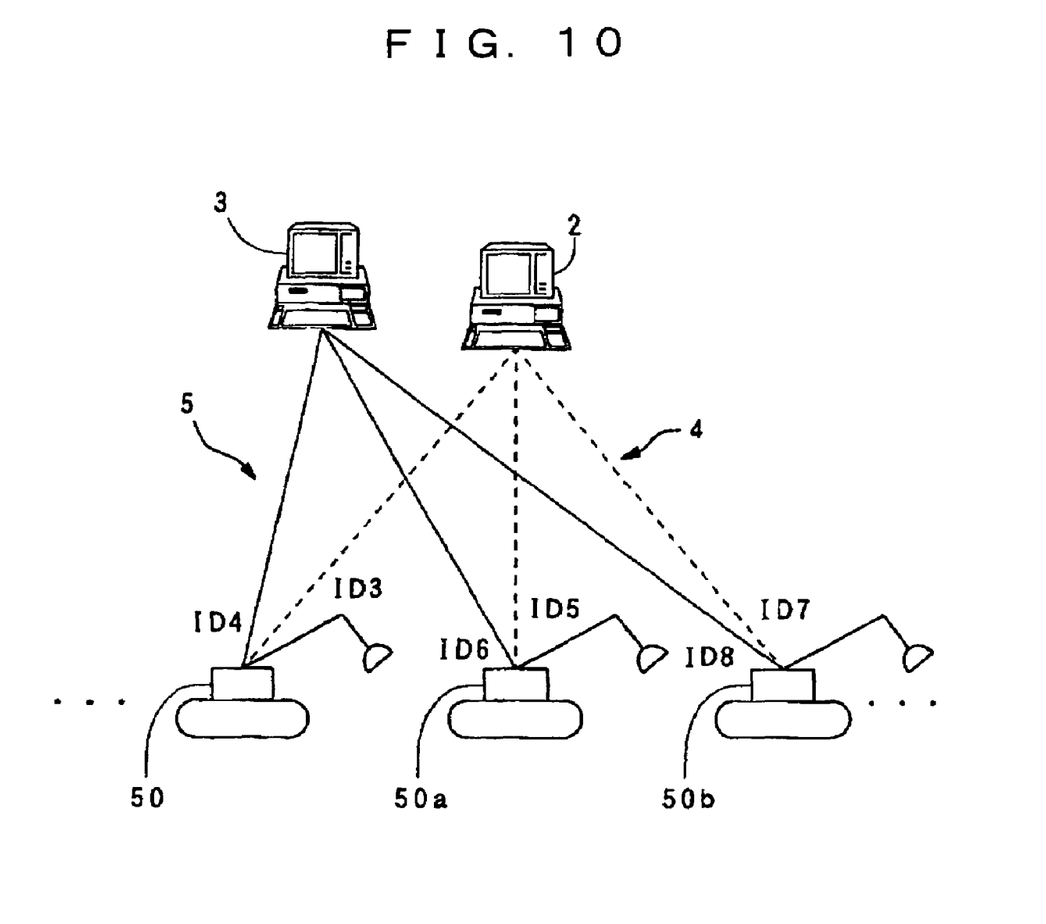
FIG. 10 is a drawing showing corresponding relationship between the servers and construction equipment in the embodiment.

Correspondence relationship between the other construction equipment and the servers is similar to the above. FIG. 10 shows the correspondence relationship between a plurality of units of construction machine 50, 50a, 50b, . . . , and the normal operation server 2 and the rewrite-only server 3. A communication terminal in the construction equipment 50a is given an IP address "ID5" corresponding to the server identification ID "ID1" of the normal operation server 2 as well as an IP address "ID6" corresponding to the server identification ID "ID2" of the rewrite-only server 3. A communication terminal in the construction equipment 50b is given an IP address "ID7" corresponding to the server identification ID "ID1" of the normal operation server 2 as well as an IP address "ID8" corresponding to the server identification ID "ID2" of the rewrite-only server 3.

The servers and the communication terminals identified by the ID1, ID3, ID5, ID7 . . . constitute the one intranet 4. The servers and the communication terminals identified by the ID2, ID4, ID6, ID8 . . . constitutes the one intranet 5.

The communication controller 30 containing a radio for packet data communication is provided in a vehicle body of the construction equipment 50. The radio communication 11 by packet communication is performed between an antenna 31 of the communication controller 30 and the antenna 10 for the ground wave. The antenna 10 is connected to the ground wave base station 8 via the private line 9. The ground wave base station 10 is, for example, a portable telephone base station. The ground wave base station 10 is connected to the intranets 4 and 5 via the private lines 14 and 15. Various controllers such as an information collection controller 20 and an engine controller 40 other than the communication controller 30 are provided in the vehicle body of the construction equipment 50. These controllers are connected to be communicable to each other by an in-vehicle communication line 51 in which communication is carried out in accordance with a predetermined communication protocol. In this embodiment, the information collection controller 20 and the communication controller 30 constitute an onboard controller 35.

Sensors for cooling water of an engine 57 and for voltage of a battery 53, a GPS sensor and the like are placed at respective sections of the vehicle body of the construction equipment 50, and the respective sensors constitute a sensor group 52. The GPS sensor receives a radio wave transmitted from a GPS satellite, and detects an absolute position of its construction equipment 50. A calendar 25 and a timer 26 are provided in the vehicle body of the construction equipment 50. The calendar 25 and the timer 26 clock a year, a month, a day, and time (time, minute, second). A service meter SMR is provided in the vehicle body of the construction equipment 50 to clock cumulative operating time of the engine 57.

In the information collection controller 20, a CPU 21, a flash memory 22 and a RAM (random access memory) 23 are connected via a bus line 24 to be capable of inputting and outputting data from and to one another. The flash memory 22 is a kind of an EEPROM (electrically erasable ROM). Instead of the RAM 23, an EEPROM such as a flash memory may be used. The onboard program 60 is stored in a predetermined storage area of the flash memory 22. A rewrite control program 61 for performing rewrite processing for rewriting the onboard program 60 is stored in a predetermined storage area of the flash memory 22.

The CPU 21 performs arithmetic operation processing in accordance with the onboard program 60 to generate vehicle condition data. The vehicle condition data is stored in a data area of the RAM 23. For example, when start lock is set to be valid, clocked values and the like of the calendar 25 and the timer 26 are taken, and processing of outputting a start lock setting command to carry out the start lock when it comes in the start lock time period, and outputting a start lock releasing command when it comes the time outside the start lock time period is performed.

The following vehicle condition data is stored in the data area of the RAM 23.

The IP address of itself (ID3, ID4)

The present version of the onboard program 60

Station opening inspection completion information that the station opening inspection of the communication terminal (communication controller 30) is completed The model, type and number of the construction equipment 50

The clocked value of the service meter SMR (cumulative operating time)

The present terminal voltage of the battery 53 (battery terminal voltage information)

The temperature of cooling water

The present absolute position of its own vehicle detected by the GPS sensor (absolute position information)

The history of error codes which occurred in the vehicle body

The key switch information showing whether or not a key switch 54 is on at present (in an ACC position)

The start lock information such as whether the start lock is valid or invalid at present, and the time period of the start lock which is set at present The bus line 24 is connected to the service meter SMR and the sensor group 52 outside the information collection controller 20 via an interface, and is also connected to the in-vehicle communication line 51 outside the controller 20 via an interface. In this embodiment, the communication controller 30 and the information collection controller 20 are provided as separate units, and the IP addresses "ID3" and "ID4" of the communication controller 30 being the communication terminal are set at the information collection controller 20, but they may be constituted such that the functions of the communication controller 30 as the communication terminal and of the information collecting controller 20 are attained with one controller.

The start lock circuit 55 is incorporated into the vehicle body of the construction equipment 50. The start lock circuit 55 is constituted of a relay and the like and interposed between the key switch 54, and a starter 56 for starting the engine 57. A power supply for the starter 56 is the onboard battery 53, and the battery 53 is also the power supply for the controllers 20, 30 and 40.

When the start lock setting command is outputted from the engine controller 40, the relay of the start lock circuit 55 is energized to be in a start lock set state. Namely, even if the key switch 54 is turned on (ACC position), the terminal voltage of the battery 53 is not applied to the starter 56. Due to this, the starter 56 is in the inoperable state, and cannot start the engine 57. On the other hand, when a start lock releasing command is outputted from the engine controller 40, the relay of the start lock circuit 55 is deenergized to be in a start lock released state. Namely, the starter 56 is operated by turning on the key switch 54 (ACC position) and enables the engine 57 to start. The start lock setting command and the start lock releasing command are given to the engine controller 40 from the information collection controller 20 via the in-vehicle communication line 51 in accordance with the onboard program 60. The start lock setting command and the start lock releasing command are outputted from the information collection controller 20 when the start lock is set to be "valid" at present. It is determined based on the clocked values of the calendar 25 and the timer 26 in the information collection controller 20 whether it is in the start lock time period or not.

The information that the key switch 54 is turned on (in the ACC position) is taken into the information collection controller 20 from the engine controller 40 via the in-vehicle communication line 51.

The normal operation server 2 manages the vehicle condition data in a plurality of units of construction equipment including the construction equipment 50. The rewrite-only server 3 is the server which remotely performs rewrite of the onboard program 60. The normal operation server 2 includes a master file 6. The latest vehicle condition data taken in the normal operation server 2 is stored in the master file 6. Meanwhile, the rewrite-only server 3 includes a master file 6'. Stored data in the master file 6 in the normal operation server 2 is taken into the rewrite-only server 3 via the Internet 7, and the master file 6' as the same memory content as the master file 6, namely, "replica" is created.

Figure 8:
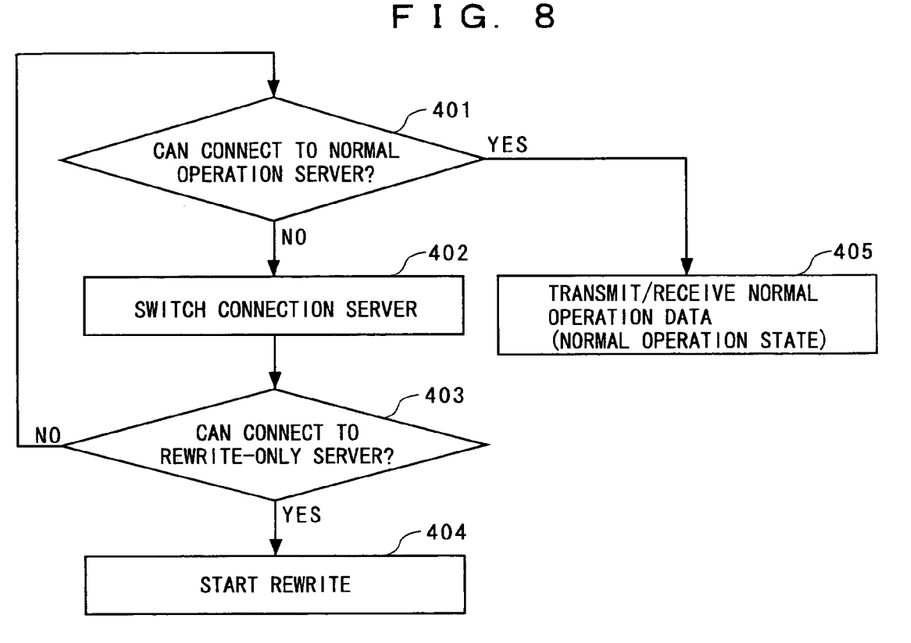
FIG. 8 is a diagram showing steps of switching processing of the servers in the embodiment.

Next, with reference to FIG. 8 in combination, explanation will be made concerning which server the construction equipment 50 establishes connection with, and its connection switching control. In an initial state, in the information collection controller 20 of the construction equipment 50, its own IP address "ID3" corresponding to the server identification ID "ID1" of the normal operation server 2 is set as "valid", and its own IP address "ID4" corresponding to the server identification ID "ID2" of the rewrite-only server 3 is set as "invalid" (normal operation mode). The data of its own IP address "ID3" set as "valid" in the information collection controller 20 is taken into the communication controller 30 from the information collection controller 20 via the in-vehicle communication line 51.

When a command demanding the vehicle condition data of the construction equipment 50 is transmitted from the normal operation server 2 to the construction equipment 50 as the radio communication 11 via the private line 14, the ground wave base station 8, the private line 9 and the antenna 10, it is received by the antenna 31 of the construction equipment 50, and this data is taken into the communication controller 30. The data transmitted from the normal operation server 2 includes the server identification ID "ID1". Since the IP address "ID3" is set in the communication controller 30 at present and the received data includes the server identification ID "ID1", both of them are determined to correspond to each other ("ID1" and "ID3", which are in the same network), and communication connection is established to establish a state in which transmission of the vehicle condition data from the construction equipment 50 is possible (determination YES in step 401).

Consequently, the command demanding the vehicle condition data is taken in the information collection controller 20 from the communication controller 30 via the in-vehicle communication line 51. For example, when a command demanding a present clocked value of the service meter SMR is taken into the controller 20, the present clocked value of the service meter SMR stored in the data area of the RAM 23 is taken into the communication controller 30 from the information collection controller 20 via the in-vehicle communication line 51. Then, the clocked value is transmitted from the antenna 31 of the communication controller 30 as the radio communication 11 and taken into the normal operation server 2 via the antenna 10, the private line 9, the ground wave base station 8 and the private line 14.

When the command to set the start lock information such as valid and invalid of the start lock, and a start lock time period is transmitted to the construction equipment 50 from the normal operation server 2, the commanded start lock information is set in the information collection controller 20. The same command may be given to the construction equipment 50 from each of the client terminal of the normal operation server 2 via the normal operation server 2.

When a specified abnormality occurs, or a specified event such as a specified time coming, the content of the abnormality, the vehicle condition data which should be regularly transmitted and the like, which are stored in the RAM 23 at the point of time of occurrence of the event, are taken into the communication controller 30 from the information collection controller 20 via the in-vehicle communication line 51. Then, they are transmitted as the radio communication 11 from the antenna 31 of the communication controller 30 (automatic transmission). The automatically transmitted vehicle condition data is taken into the normal operation server 2 via the antenna 10, the private line 9, the ground wave base station 8 and the private line 14.

The vehicle condition data of the construction equipment 50 taken into the normal operation server 2 is displayed on a display screen of each client terminal by access to the normal operation server 2 from each client terminal connected to the network belonging to the normal operation server 2, that is, the Internet 7 and the intranet 4. The latest vehicle condition data taken in the normal operation server 2 is stored in the master file 6, and stored in the master file 6' via the Internet 7 (step 405).

When the onboard program 60 is upgraded, and when threshold values and the like for error code generation and abnormality determination are desired to be changed for each construction equipment, an old onboard program 60' stored in the flash memory 22 is rewritten to the new onboard program 60. In the following explanation, the old inboard program 60 is given a dash to be distinguished from the new onboard program 60.

When the command to rewrite the onboard program 60 of the construction equipment 50 is transmitted to the construction equipment 50 as the radio communication 11 from the rewrite-only server 3 via the private line 15, the ground wave base station 8, the private line 9 and the antenna 10, it is received by the antenna 31 of the construction equipment 50, and this data is taken into the communication controller 30. The data transmitted from the rewrite-only server 3 includes the server identification ID "ID2". The present IP address "ID3" is set in the communication controller 30, and the received data includes the server identification ID "ID2". Consequently, it is determined that both of them do not correspond to each other ("ID2" and "ID3", which are not in the same network), and the communication connection is disconnected (determination NO in step 401).

The information that the communication connection is disconnected due to inconformity of the identification IDs is taken into the information collection controller 20 from the communication controller 30 via the in-vehicle communication line 51. On receiving this, in the information collection controller 20, the IP address of itself "ID4" corresponding to the server identification ID "ID2" of the rewrite-only server 3 is switched to "valid", and the IP address of itself "ID3" corresponding to the server identification ID "ID1" of the normal operation server 2 is switched to "invalid" (rewrite mode). The data of the IP address of itself "ID4" set as "valid" in the information collection controller 20 is taken into the communication controller 30 from the information collection controller 20 via the in-vehicle communication line 51 (step 402).

Receiving that the communication connection is disconnected, the rewrite-only server 3 transmits the rewrite command to the construction equipment 50 again. The data transmitted from the rewrite-only server 3 includes the server identification ID "ID2". Since the IP address "ID4" is set in the communication controller 30 at present, and the received data includes the server identification ID "ID2", both of them are determined to correspond to each other ("ID2" and "ID4", which are in the same network), and the communication connection is established (determination YES in step 403). Thereinafter, on the premise that certain specified conditions are cleared, processing of rewriting the onboard program 60 is performed in the information collection controller 20 in response to the command from the rewrite-only server 3 (step 404).

As described above, according to this embodiment, the communication connection can be switched between the construction equipment 50 and each of the servers such as the normal operation server 2 and the rewrite-only server 3. Consequently, when a number of units of construction equipment 50, 50a, 50b . . . exist as shown in FIG. 10, it is possible to establish the communication connection between certain construction equipment and the normal operation server 2 to perform the normal operation processing, while establishing the communication connection between the other construction equipment and the rewrite-only server 3 in parallel with this to perform rewrite processing. As a result, it does not happen that high load is exerted on the server, or the communication path is occupied by transmission of a program of a large data amount, and therefore transmission and reception of the data are stably performed between the server and a number of units of construction equipment.

Figure 2:
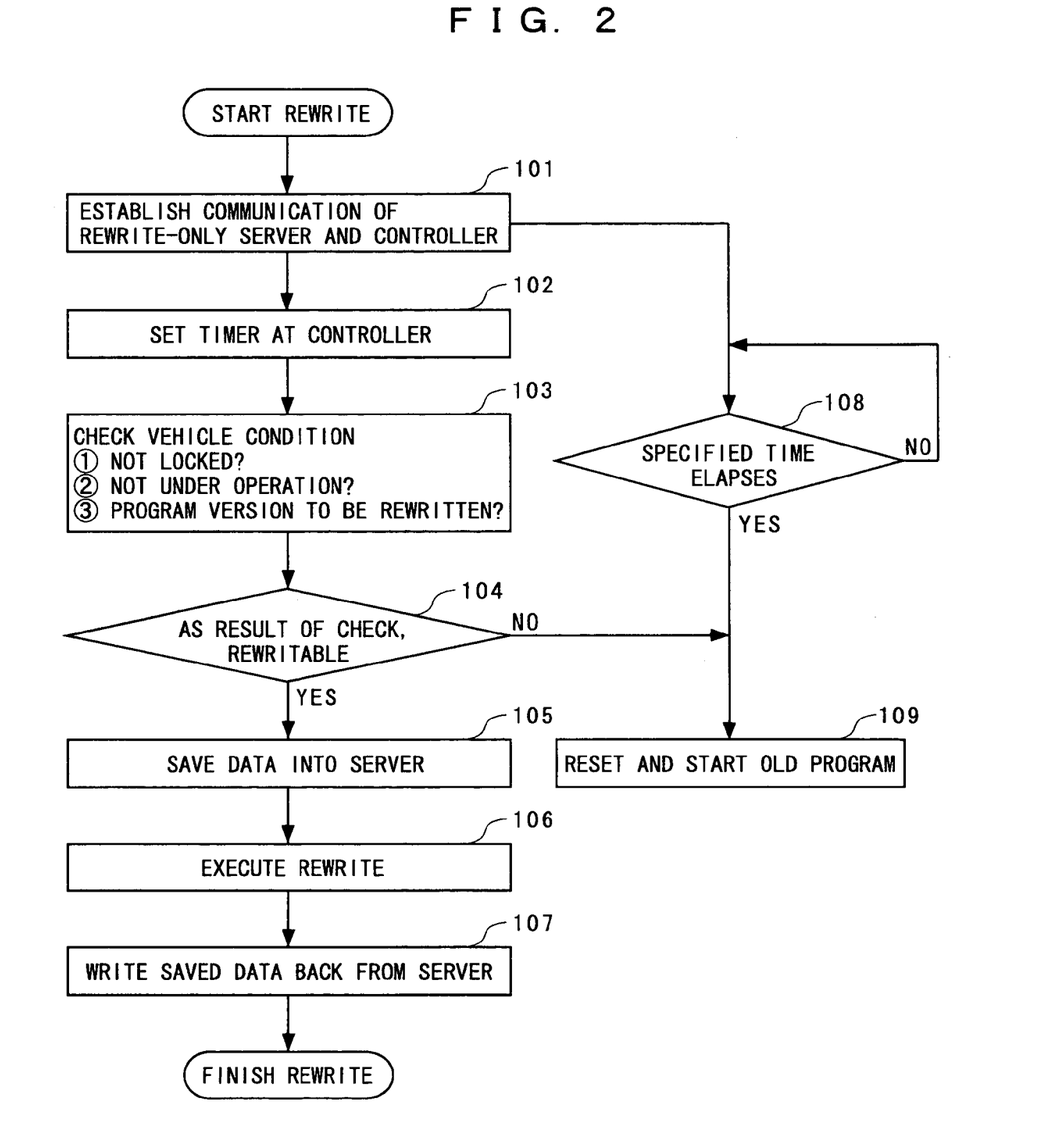
FIG. 2 is a chart showing steps of rewrite processing in the embodiment.

The procedural steps of processing of rewriting the onboard program 60 in response to the command from the rewrite-only server 3 are shown in FIG. 2. A return control to the normal operation mode will be explained. As shown in FIG. 2, when the communication connection is established between the construction equipment 50 and the rewrite-only server 3 in step 403 in FIG. 8 (step 101 in FIG. 2), the timer 26 is set in the information collection controller 20, and a timer task is executed (steps 102, 108 and 109). Here, the set time of the timer 26 is set at a time T including allowance in the time required for the rewrite processing.

The information collection controller 20 performs a multitask operation, and the timer task is independently operated from the other task, namely, a rewriting task (steps 103 to 107). For this reason, even if the other task runs away, the timer task operates reliably and makes it possible to start the old onboard program 60' by self reset processing (step 109). When the rewrite task (steps 103 to 107) is normally completed, the timer 26 is cleared before the set time T elapses, and the onboard program is rewritten to the new onboard program 60.

If a communication abnormality or hang-up occurs halfway through the rewrite task (steps 103 to 107), the rewrite processing is not finished even after the set time T of the timer 26 elapses (determination YES in step 108), and the reset processing is executed, whereby the old onboard program 60' is started. Namely, when the rewrite processing is not finished even after the set time T elapses, the reset processing is performed by the switching command based on the signal from the timer 26, and the processing is switched to the normal operation processing.

Further, the communication state of the construction equipment 50 and the servers is switched from the rewrite mode to the normal operation mode. Namely, in the information collection controller 20, the IP address of itself "ID4" corresponding to the server identification ID "ID2" of the rewrite-only server 3 is returned to "invalid", and the IP address of itself "ID3" corresponding to the server identification ID "ID1" of the normal operation server 2 is returned to "valid" (normal operation mode). The data "ID3" of the IP address of itself, which is set as "valid" in the information collection controller 20, is taken into the communication controller 30 from the information collection controller 20 via the in-vehicle communication line 51. Consequently, communication connection is enabled between the normal operation server 2 and the construction equipment 50 thereinafter, and the normal operation processing can be performed (step 109).

As described above, according to this embodiment, even when a communication abnormality and abnormality such as hang up occur halfway through the rewrite processing, the function of the information collection controller 20 can be kept reliably by starting the old onboard program 60'. Consequently, the normal operation processing can be reliably performed, and reduction in operation efficiency due to the information collection controller 20 being unable to function can be prevented. After the set time T of the timer 26 elapses, the rewrite mode is shifted to the normal operation mode. Consequently, it is avoided that the communication path is occupied for a long period of time by communication for rewrite processing, and communication for the normal operation processing is secured, whereby the normal operation processing can be prevented from being hindered. Switching from the rewrite mode to the normal operation mode may be carried out by transmitting a logout signal (switching command) from the terminal 36 or the terminal 37 respectively connected to the intranet 5 or the Internet 7 to the rewrite-only server 3 at any optional time.

Next, check processing of the vehicle condition data will be explained. When the communication connection of the rewrite-only server 3 and the communication controller 30 of the construction equipment 50 is established in step 101 in FIG. 2, the rewrite command transmitted from the rewrite-only server 3 is taken into the information collection controller 20 from the communication controller 30 via the in-vehicle communication line 51. When the information collection controller 20 receives the rewrite command, processing of checking the present vehicle condition data is executed in the next step 103. In step 104, determination processing of whether the rewrite processing of the onboard program 60 should be executed or not (rewrite processing is possible or not) is executed in accordance with the check result.

The check processing and determination processing in steps 103 and 104 are carried out in the rewrite-only server 3. Namely, when the information collection controller 20 receives the rewrite command, the vehicle condition data to be checked is transmitted to the communication controller 30 from the information collection controller 20 via the in-vehicle communication line 51. Consequently, the vehicle condition data to be checked is transmitted as the radio communication 11 from the antenna 31 of the communication controller 30, and taken into the rewrite-only server 3 via the antenna 10, the private line 9, the ground wave base station 8 and the private line 15.

The rewrite-only server 3 checks the vehicle condition data it receives, and determines that the rewrite processing should be executed on the condition that all the following conditions are satisfied.

Condition 1: Start lock is not underway

Condition 2: The construction equipment 50 is not under operation

Condition 3: The old onboard program 60' of the present is the version to be rewritten.

The reason whey the condition 1 is made the condition of execution of the rewriting processing is that there is the fear that the information collection controller 20 does not function halfway through the rewrite processing, and there is the fear that the command to release the start lock cannot be outputted as a result that the information collection controller 20 does not function. "Start lock is not underway" is determined based on the start lock information stored in the information collection controller 20. For example, when the start lock is set to be "invalid", and when the start lock is "valid" and the present time is outside the start lock time period, it is determined that "Start lock is not underway".

The reason why the condition 2 is made the condition of rewrite processing is that there is the fear that the communication is discontinued or the communication becomes unstable depending on the operation state (for example, during traveling) during transmission of the new program 60 to the construction equipment 50 under operation, and the rewrite processing is not finished normally. "The construction equipment 50 is not under operation" is determined based on the key switch information stored in the information collection controller 20. For example, when the key switch 54 is off (ACC position off), it is determined that "The construction equipment 50 is not under operation". It can be also determined by detecting the terminal voltage of an alternator or detecting the speed of the engine 57 whether the construction equipment 50 is under operation or not.

The reason why the condition 3 is made the condition is that there is no need to perform the rewrite processing. As described above, the version of the present onboard program is stored in the information collection controller 20 as the vehicle condition data. Other than the above, the following conditions may be properly added.

Condition 4: The communication terminal (communication controller 30) with the station opening inspection being completed Condition 5: The battery terminal voltage is in the normal range Condition 6: The construction equipment 50 is located in the place where the radio communication 11 is stably performed or in a safe place The reason why the condition 4 is made the condition is that preparation for managing the construction equipment 50 is not made at the server side. The reason why the condition 5 is made the condition is that if the terminal voltage of the battery 53 is out of the normal range, there arises the fear that the CPU 21 of the information collection controller 20 cannot be stably operated and the rewrite processing is not finished normally. "The battery terminal voltage is in the normal range" is determined based on the battery terminal voltage information stored in the information collection controller 20.

The reason why the condition 6 is made the condition is that there is the fear that the communication is disconnected or the communication becomes unstable during transmission of the new onboard program 60 to the construction equipment 50, and the rewrite processing is not finished normally. This is because the safety of the construction equipment 50 is secured even if the controller does not function. "The construction equipment 50 is located in the place where the radio communication 11 is stably performed or in a safe place" is determined based on the absolute position information stored in the information collection controller 20. Instead of making it the condition of execution of the rewrite processing to satisfy all the conditions 1 to 6, any one or the combination of two or more of these conditions may be made the condition of the execution of rewrite processing.

The rewrite-only server 3 determines whether it executes the rewrite processing or not with reference to the vehicle condition data stored in the information collection controller 20. However, whether to execute the rewrite processing or not may be determined with reference to the vehicle condition data stored in the master file 6' because the master file 6' stores the latest vehicle state data of the construction equipment 50. Whether the rewrite processing is to be executed or not may be determined with reference to the vehicle condition data stored in the information collection controller 20 and the vehicle condition data stored in the master file 6' in combination.

Figure 7:
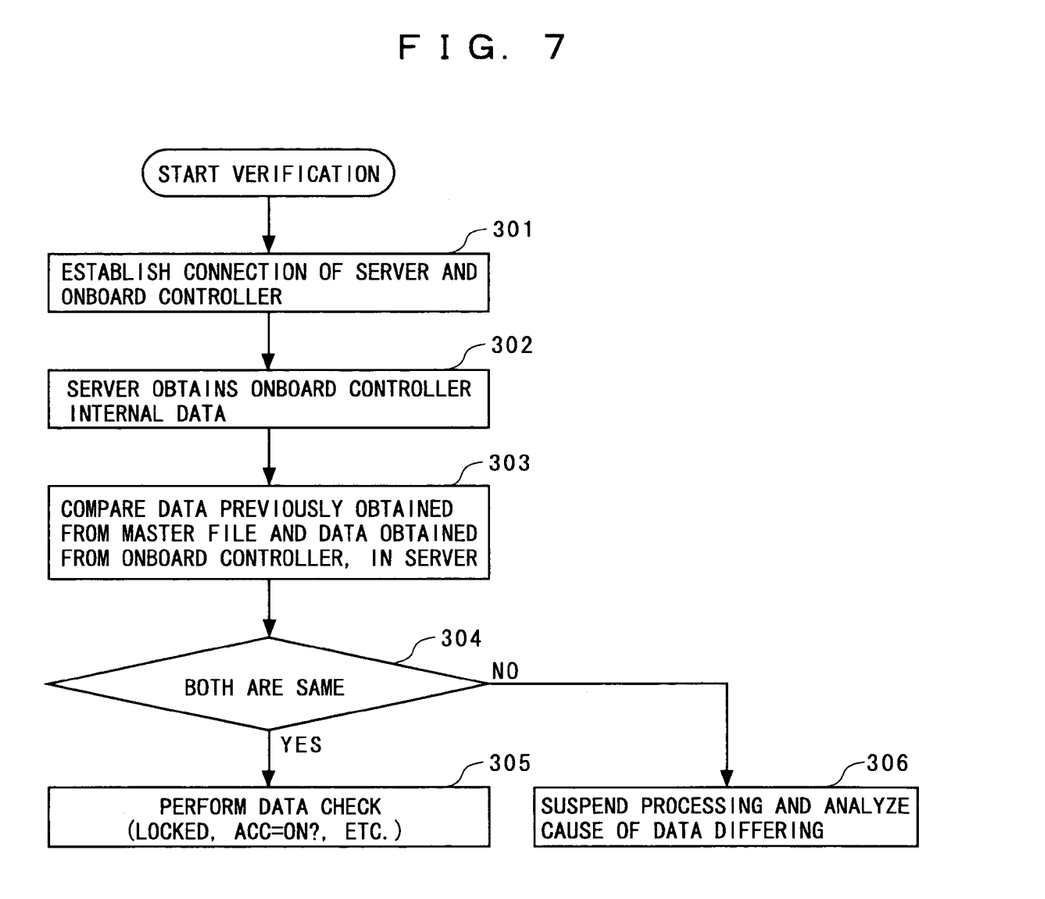
FIG. 7 is a chart showing processing steps in the case in which the data is verified in the embodiment.

FIG. 7 shows procedural steps of processing of verifying both data when referring to the vehicle condition data stored in the information collection controller 20 and the vehicle condition data stored in the master file 6'. Namely, when the communication connection of the rewrite-only server 3 and the communication controller 30 is established (step 301), the vehicle condition data which should be checked inside the information collection controller 20 is transmitted to the rewrite-only server 3 from the construction equipment 50, and is obtained by the rewrite-only server 3 (step 302).

Meanwhile, the rewrite-only server 3 obtains the same vehicle condition data which should be checked with reference to the master file 6'. Thereupon, the vehicle condition data previously obtained with reference to the master file 6' and the vehicle condition data obtained from the inside of the information collection controller 20 are compared (step 303), and it is determined whether both of them are the same or not. For example, with respect to the start lock information, it is determined whether the data of the master file 6' and the date inside the information collection controller 20 are the same (step 304).

When both of them are the same as a result of this (determination Y in step 304), the check processing of step 103 in FIG. 2 is executed, and further the processing of determining whether the rewrite should be performed or not in step 104 is executed (step 305). However, when both of them are not the same (determination N in step 305), the check processing and the processing of determining whether the rewrite should be performed or not thereinafter are suspended, and processing of analyzing the cause of the data difference is executed (step 306).

When the rewrite-only server 3 determines the rewrite processing should be performed (determination YES in step 104), the data to that effect is transmitted to the construction equipment 50 from the rewrite-only server 3. Thereafter, rewrite of the old onboard program 60' to the new onboard program 60 is executed in the information collection controller 20 (steps 105 to 107). However, when the rewrite-only server 3 determines that it should not execute the rewrite processing (determination NO in step 104), the data to that effect is transmitted to the construction equipment 50 from the rewrite-only server 3 and taken into the information collection controller 20. The information collection controller 20 receives this, and executes the reset processing as in the case in which the timer 26 exceeds the set time T, and starts the old onboard program 60'. Further, the communication state of the construction equipment 50 and the server is switched from the rewrite mode to the normal operation mode. Consequently, thereinafter the communication connection becomes possible between the normal operation server 2 and the construction equipment 50, and the normal operation processing can be performed (step 109).

As described above, according to this embodiment, the vehicle condition data is previously checked on the rewrite processing, and therefore the situation in which the rewrite processing is not finished normally and the situation in which the dangerous condition is brought about can be avoided in advance. Especially because the situation in which the information collection controller 20 does not function in the start lock state can be avoided, the situation in which the availability reduces can be avoided in advance.

Figure 3A:
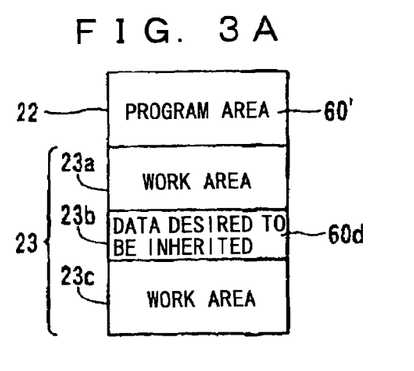
FIG. 3A shows a state before rewrite.

Next, with reference to FIG. 3A to FIG. 3F in combination with FIG. 2, the rewrite processing of steps 105 to 107 in FIG. 2 (save processing of the vehicle condition data) will be explained. FIG. 3A shows the state of the flash memory 22 and the RAM 23 before rewrite. As shown in FIG. 3A, the onboard program 60' is stored in a program area of the flash memory 22. A rewrite control program 61 is stored in a storage area (not shown) of the flash memory 22. The rewrite control program 61 is the program for performing processing of rewriting the old onboard program 60' to the new onboard program 60. The RAM 23 is constituted of work areas 23a and 23c and a data area 23b storing the vehicle condition data 60d. The work areas 23a and 23c are the free-space areas.

Figure 3B:
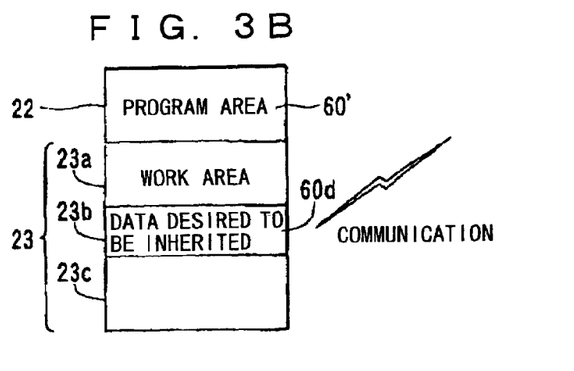
FIG. 3B shows a state in which data desired to be inherited is communicated and saved in a server.

When the rewrite-only server 3 determines that the rewrite processing should be executed (determination YES in step 104), the data to that effect is transmitted to the construction equipment 50 as the radio communication 11 from the rewrite-only server 3 via the private line 15, the ground wave base station 8, the private line 9 and the antenna 10. Then, it is received by the antenna 31 of the construction equipment 50, and taken into the information collection controller 20 from the communication controller 30 via the in-vehicle communication line 51. On receiving this, the CPU 21 reads out the vehicle condition data 60d from the data area 23b as shown in FIG. 3B, and transmits this to the communication controller 30 from the information collection controller 20 via the in-vehicle communication line 51. Consequently, the vehicle condition data 60d is transmitted as the radio communication 11 from the antenna 31 and taken into the rewrite-only server 3.

Figure 3C:
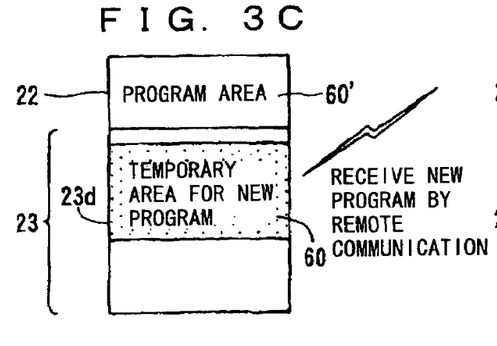
FIG. 3C shows remote reception of a new program.

The rewrite-only server 3 stores the vehicle condition data 60d in a predetermined storage medium 32 (refer to FIG. 1) in the server 3 (step 105 in FIG. 2) to save it. When the vehicle condition data 60d is saved in the rewrite-only server 3, the new onboard program 60 is taken into the information collection controller 20 from the rewrite-only server 3 via the same path. On receiving this, the CPU 21 temporarily buffers the new onboard program 60, which it receives, in a temporary area 23d as shown in FIG. 3C. The temporary area 23d includes not only the work areas 23a and 23c but also the data area 23b. Namely, the capacity of the new onboard program 60 is often so large as to correspond to the entire area of the RAM 23, but since the vehicle condition data 60d is saved and the data area 23b can be used as the buffer area for the new onboard program 60, the new onboard program 60 of a large capacity can be surely buffered on the RAM 23.

Figure 3D:
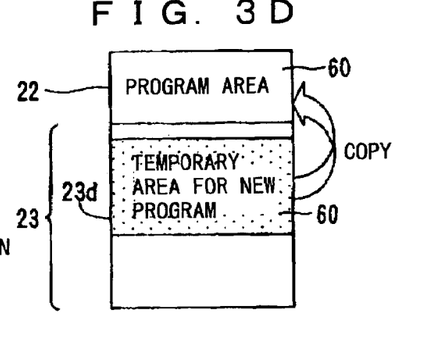
FIG. 3D shows rewrite to a new program.

The rewrite control program 61 stored in the flash memory 22 is copied in a predetermined storage area of the RAM 23, whereby a system control right is transferred to the copied rewrite control program 61 on the RAM 23, and the flash memory 22 is in the rewrite mode. Due to this, thereinafter, the old onboard program 60' on the flash memory 22 is rewritten by the new onboard program 60 on the RAM 23 in accordance with the rewrite control program 61 on the RAM 23 as shown in FIG. 3D. Namely, after CRC check of the new onboard program 60 buffered on the temporary area 23d is performed, the new onboard program 60 is copied in the program area of the flash memory 22, namely the area in which the old onboard program 60' is stored, and the old onboard program 60' is rewritten into the new onboard program 60 (step 106).

Figure 3E:
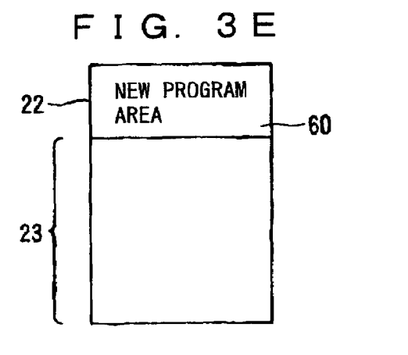
FIG. 3E shows a state in which the new program is copied in the memory.
Figure 3F:
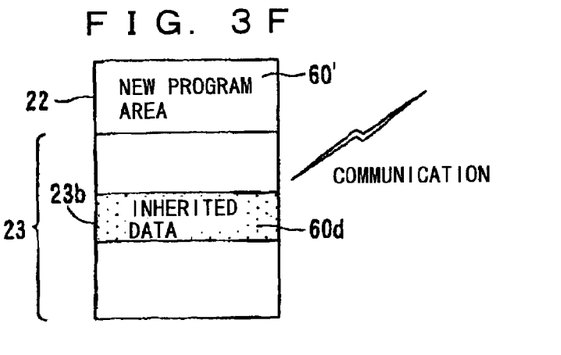
FIG. 3F shows a state in which the inherited data is received from the server.

When the new onboard program 60 is copied in the flash memory 22 as shown in FIG. 3E, the data to that effect is taken into the rewrite-only server 3 from the information collection controller 20 via the in-vehicle communication line 51 and the like. The rewrite-only server 3 receives this, and transmits the vehicle condition data 60d saved in the storage medium 32 to the construction equipment 50. The vehicle condition data 60d is received by the antenna 31, and taken into the information collection controller 20. On receiving this, the CPU 21 performs the processing of writing the vehicle condition data 60d, which it receives, back into the original data area 23b as shown in FIG. 3F (step 107).

When the rewrite processing is finished, the CPU 21 performs self reset processing. As a result, the system control right is transferred to the flash memory 22, the flash memory 22 is in the normal mode, and the new onboard program 60 stored in the program area of the flash memory 22 is started. Incidentally, when the old onboard program 60' is rewritten into the new onboard program 60, the address of the vehicle condition data 60d is sometimes changed. Consequently, while the vehicle condition data 60d is saved in the rewrite-only server 3, the processing of rewriting the vehicle condition data 60d such as changing the address of the vehicle condition data 60d so as to correspond to the new onboard program 60 may be performed, so that the rewritten vehicle condition data 60d may be written back into the original data area 23b.

As described above, according to this embodiment, the vehicle condition data 60d which should not be reset on the rewrite processing, such as the clocked value of the service meter SMR (cumulative operating time), the past history of the errors which occurred in the vehicle body and the like is saved in the storage medium 32 of the rewrite-only server 3 from the data area 23b at the time of the rewrite processing. Then, after the rewrite processing is finished, it is written back into the original data area 23b, and therefore the vehicle condition data 60d which is desired to be inherited can be reliably left on the memory of the information collection controller 20. Since the data area 23b after the vehicle condition data 60d is saved can be used as the buffer area for the new onboard program 60, the onboard program 60 of a large capacity can be reliably buffered on the memory of a small capacity in the information collection controller 20, and the rewrite processing can be reliably performed.

In the aforementioned embodiment, the vehicle condition data 60d is saved in the storage medium 32 of the rewrite-only server 3 outside the construction equipment 50, but it may be suitable it only the vehicle condition data 60d can be saved in another storage area or another storage medium, and therefore it may be saved inside the construction equipment 50. For example, as another storage area, there is a memory area 23e (see FIG. 5A) of the RAM 23, which will be explained later. As still another medium, there is, for example, the flash memory 22 in the information collection controller 20 of the onboard controller 35, or the storage medium 58 (see FIG. 1) provided in the construction equipment 50 and outside the onboard controller 35.

Figure 5A:
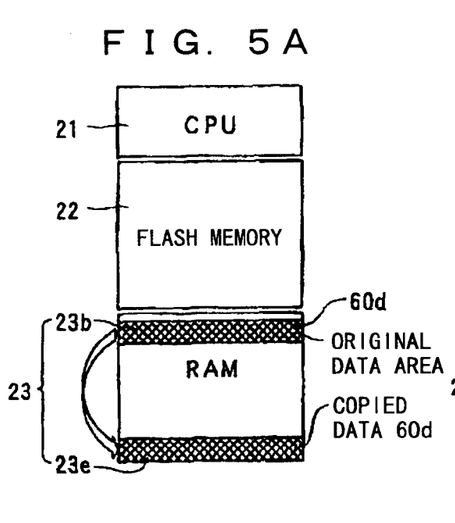
FIG. 5A shows a copy of the data to a RAM tail end.
Figure 5B:
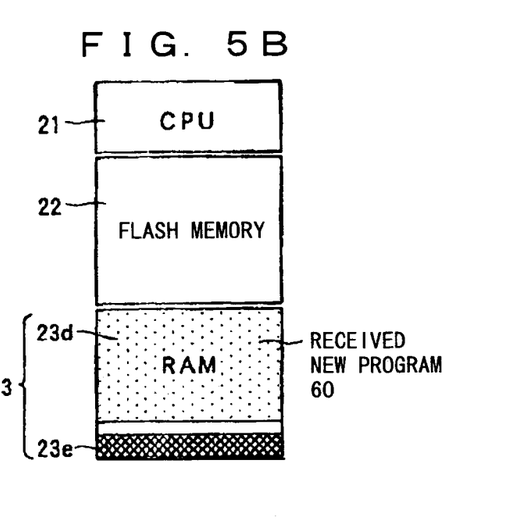
FIG. 5B shows temporary buffering of the new program.

FIG. 5A to FIG. 5D show the status transition of the memory when the vehicle condition data 60d is saved in different storage areas on the same RAM 23. Hereinafter, FIG. 5A to FIG. 5D will be explained in combination of a flow chart in FIG. 6. As shown in FIG. 5A, the vehicle condition data 60d stored in the data area 23b is copied and saved in the storage area 23e at a tail end of the RAM 23 (step 201). Next, as shown in FIG. 5B, the new onboard program 60 received from the rewrite-only server 3 is temporarily buffered in the temporary area 23d including the data area 23b (step 202).

Figure 5C:
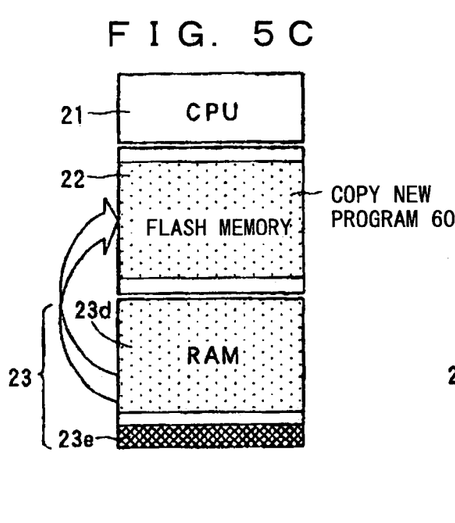
FIG. 5C shows a copy of the new program to the flash memory.
Figure 5D:
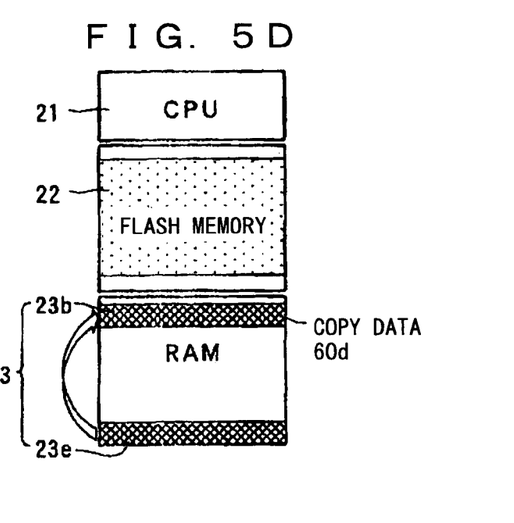
FIG. 5D shows a copy of the data to a regular position.
Figure 6:
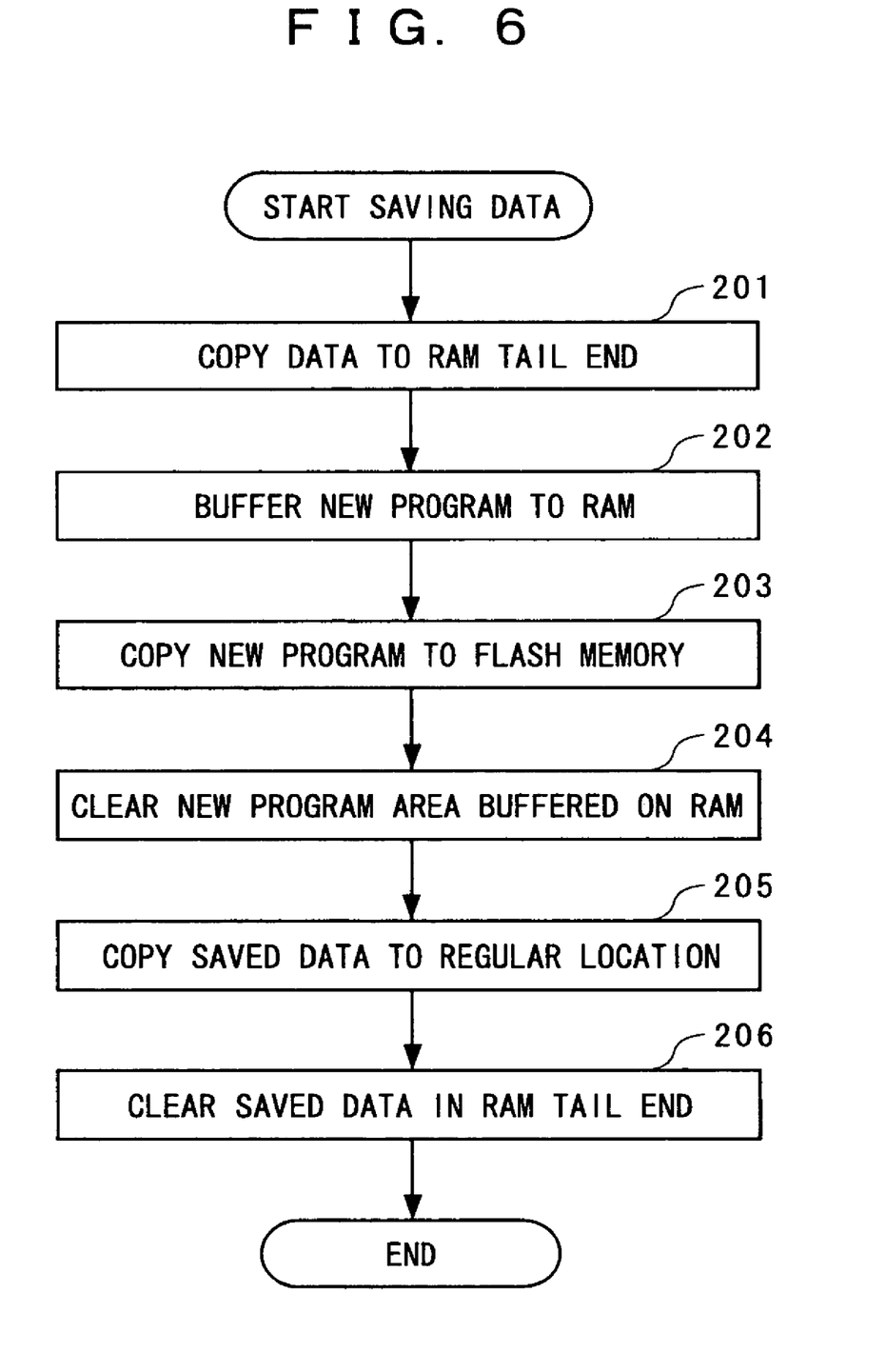
FIG. 6 is a chart showing processing steps in the case in which the data is saved in the embodiment.

As shown in FIG. 5C, the new onboard program 60 buffered in the temporary area 23d is copied in the program area of the flash memory 22 (step 203). After this rewrite processing, the new onboard program 60 remaining in the temporary area 23d is cleared (step 204). Next, as shown in FIG. 5D, the vehicle condition data 60d saved in the storage area 23e is written back into the data area 23b which is the original regular location (step 205). After the writing back, the vehicle condition data 60d remaining in the storage area 23e is cleared (step 206). The clearing processing in steps 204 and 206 is performed as necessary, and the program and the data may be left there without being cleared.

In FIG. 5A to FIG. 5D, the vehicle condition data 60d is saved in the different storage area on the RAM 23 being the same memory medium, but it may be saved in a different storage medium from the RAM 23, in the vehicle body in the same manner. For example, as shown in FIG. 1, the construction equipment 50 includes the controllers such as the communication controller 30, and the engine controller 40 other than the information collection controller 20. Consequently, at the time of the rewrite processing, the vehicle condition data 60d may be saved in a storage medium in the different controller via the in-vehicle communication line 51 from the information collection controller 20, and the vehicle condition data 60d may be written back into the original data area 23b in the information collection controller 20 from the different controller after the rewrite processing is finished. As the different storage medium from the RAM 23, the storage medium 33 in the communication controller 30, or the storage medium 41 in the engine controller 40 as shown in, for example, FIG. 1 are cited.

Figure 4:
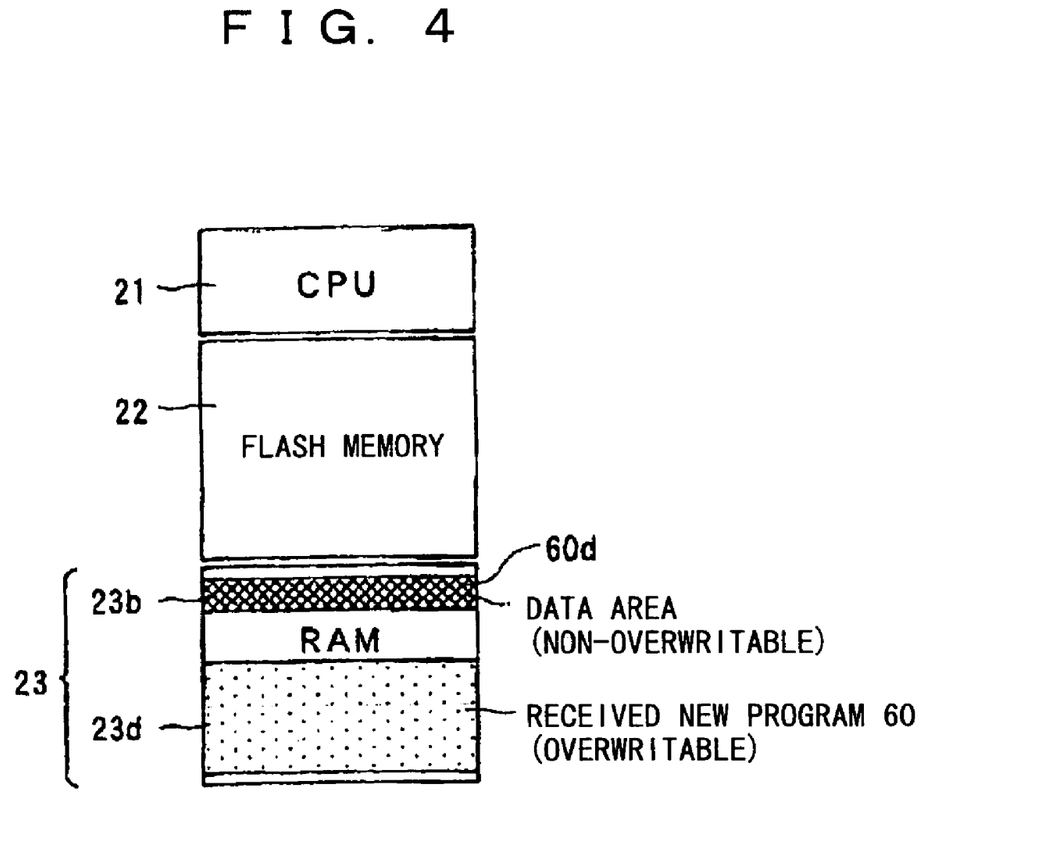
FIG. 4 is a diagram showing a data area which does not allow rewrite in the embodiment.

In the aforementioned embodiment, the vehicle condition data 60d is saved in the different storage area, but it may be suitable if only the vehicle condition data 60d is not reset during the rewrite processing, and it does not necessarily have to be saved in the different area. Namely, as shown in FIG. 4, the data area 23b is set as the area in which overwriting is not possible, and the temporary area 23d is set as the area in which overwriting is possible. Consequently, the new onboard program 60, which is transmitted from the rewrite-only server 3, is temporarily buffered in the temporary area 23d in which overwriting is possible, but is not buffered in the data area 23b in which overwriting is not possible. This can prevent the vehicle condition data 60d stored in the data area 23b from being reset during rewrite processing.

Figure 9:
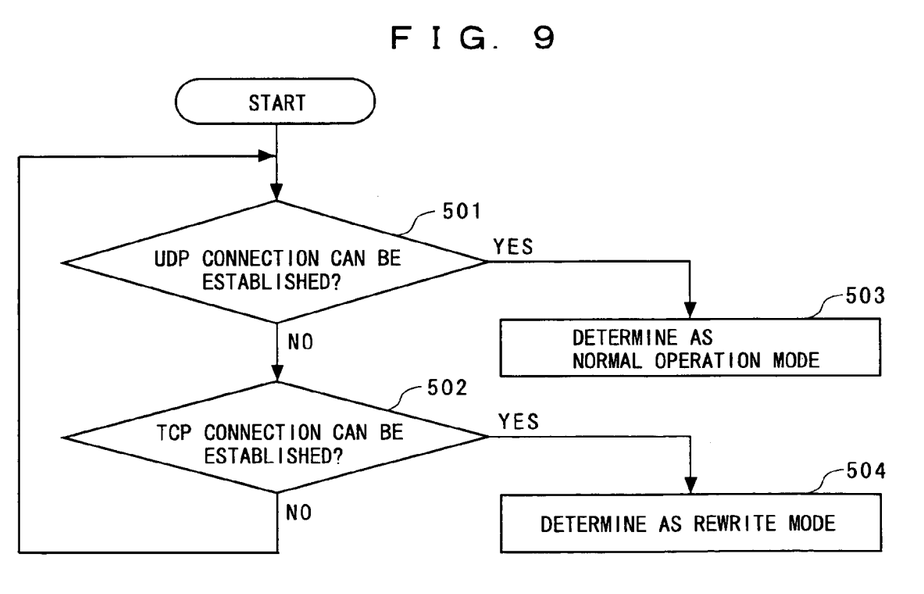
FIG. 9 is a chart showing steps of switching processing of a normal operation mode and a rewrite mode in the embodiment.

The embodiment explained above is described on the assumption that the normal operation processing and the rewrite processing are performed in the respective two servers, but the normal operation processing and the rewrite processing may be performed in one server. For example, not only the ordinary operation processing but also the rewrite processing may be performed in, for example, the normal operation server 2. FIG. 9 shows procedural steps for performing processing of switching the normal operation mode and the rewrite mode between the normal operation server 2 and the construction equipment 50.

In this case, two transport layer protocols of UDP and TCP are prepared as communication protocols between an application program on the side of the normal operation server 2 and an application program on the side of the construction equipment 50. Consequently, when the data is transmitted from the normal operation server 2 in accordance with the communication protocol of the UDP, the communication controller 30 on the side of the construction equipment 50 establishes connection with the application program of the UDP, and invalidates connection with the other application program of the TCP (determination Y in step 501). On receiving this, the communication controller 30 determines that the normal operation mode is established, and thereinafter it executes the normal operation processing via the information collection controller 20 (step 503). On the other hand, when the data is transmitted from the normal operation server 2 in accordance with the communication protocol of the TCP, the communication controller 30 establishes connection with the application program of the TCP, and invalidates the connection with the other application program of the UDP (determination Y in step 502). On receiving this, the communication controller 30 determines that the rewrite mode is established, and thereinafter, it executes the rewrite processing via the information collection controller 20 (step 504).

In the case in which two servers are provided, it is also possible to use one server as a main server and the other server as a spare server. For example, the normal operation processing and rewrite processing are performed in the one server, but when this server receives maintenance or the like, the other spare server may be operated to perform the normal operation processing and the rewrite processing. In this case, the method of the aforementioned embodiment can be applied to switching of the communication connection between the two servers and the construction equipment. This embodiment is explained with the construction equipment 50 cited as the vehicle, but the present invention can be applied to the case in which the onboard programs of any optional vehicles such as ordinary automobiles are rewritten.

What is claimed is:

1. An apparatus comprising:
   an onboard controller which is provided in a vehicle, and which executes processing in accordance with an onboard program; and
   a first storage medium including a data area in which vehicle condition data collected by an information collection controller of said onboard controller is stored;
   wherein when a command is given to rewrite the onboard program into a new onboard program, the vehicle condition data stored in said data area is written and saved in one of: (i) a storage area in said first storage medium which is different from said data area, and (ii) a second storage medium that is different from said first storage medium, and wherein rewrite processing is then executed to rewrite the onboard program into the new onboard program; and
   wherein when said rewrite processing is finished, the saved vehicle condition data is written back into said data area in the first storage medium.

2. The apparatus according to claim 1, wherein while said vehicle condition data is saved in the one of said storage area and said second storage medium, said data area in said first storage medium is used as a buffer area for the new onboard program.

3. The apparatus according to claim 1, wherein the second storage medium comprises at least one of: a storage medium provided in said information collection controller separately from said first storage medium, a storage medium which is inside said vehicle and provided outside said information collection controller, and a storage medium in a server which is outside said vehicle and which is communicably connected to said onboard controller.

4. The apparatus according to claim 3, wherein while said vehicle condition data is saved in the one of said storage area and said second storage medium, said data area in said first storage medium is used as a buffer area for the new onboard program.

5. A system comprising:
   a plurality of servers;
   an onboard controller which is provided in a vehicle and which executes processing in accordance with an onboard program; and
   a communication system for communicably connecting said servers and said onboard controller in the vehicle, said vehicle being separate from the servers;
   wherein said system is operable in both: i) a normal operation mode for transmitting and receiving vehicle condition information between said servers and said onboard controller, and ii) a rewrite mode for rewriting the onboard program of said onboard controller into a new onboard program transmitted from at least one of said servers, and wherein said system is switchable between the two modes in a communication state; and
   wherein when an onboard program rewrite command is issued from at least one of said servers, said system switches from the normal operation mode to the rewrite mode, and when a command to switch to the normal operation mode is transmitted during the rewrite mode, said system switches from the rewrite mode to the normal operation mode.

6. The system according to claim 5, wherein said command to switch to the normal operation mode is issued in accordance with at least one of a signal from a timer means and a logout signal.

7. A system comprising:
a server;
an onboard controller which is provided in a vehicle and which executes processing in accordance with an onboard program; and
a communication system for communicably connecting said server and said onboard controller in the vehicle, said vehicle being separate from the server;
wherein when said server is to execute rewrite processing of the onboard program of said onboard controller via said communication system, said server determines whether or not to execute the rewrite processing of said onboard program by analyzing a memory content of said onboard controller.

8. The system according to claim 7, wherein when said server determines whether or not to execute the rewrite processing of said onboard program, said server compares the memory content of said onboard controller and a memory content of a master file.

9. The system according to claim 7, wherein when said server determines whether or not to execute the rewrite processing of said onboard program, said server checks vehicle condition data of said vehicle, and when contents of the vehicle condition data indicate that starting of said vehicle is locked, said server does not execute the rewrite processing.

10. The system according to claim 7, wherein when said server determines whether or not to execute the rewrite processing of said onboard program, said server compares the memory content of said onboard controller and a memory content of a master file, and checks vehicle condition data of said vehicle, and when contents of the vehicle condition data indicate that starting of said vehicle is locked, said server does not execute the rewrite processing.

11. The system according to claim 7, wherein when said server determines whether or not to execute the rewrite processing of said onboard program, said server checks vehicle condition data of said vehicle, and when contents of the vehicle condition data indicate that said vehicle is located at a specified position, said server executes the rewrite processing.

12. The system according to claim 7, wherein when said server determines whether or not to execute the rewrite processing of said onboard program, said server compares the memory content of said onboard controller and a memory content of a master file, and checks vehicle condition data of said vehicle, and when contents of the vehicle condition data indicate that said vehicle is located at a specified position, said server executes the rewrite processing.

13. The system according to claim 7, wherein the memory content of said onboard controller comprises at least one of said onboard program and vehicle condition data.

14. The system according to claim 13, wherein when said server determines whether or not to execute the rewrite processing of said onboard program or not, said server compares the memory content of said onboard controller and a memory content of a master file.

15. The system according to claim 13, wherein when said server determines whether or not to execute the rewrite processing of said onboard program, said server checks the vehicle condition data of said vehicle, and when contents of the vehicle condition data indicate that starting of said vehicle is locked, said server does not execute the rewrite processing.

16. The system according to claim 13, wherein when said server determines whether or not to execute the rewrite processing of said onboard program, said server compares the memory content of said onboard controller and a memory content of a master file, and checks the vehicle condition data of said vehicle, and when contents of the vehicle condition data indicate that starting of said vehicle is locked, said server does not execute the rewrite processing.

17. The system according to claim 13, wherein when said server determines whether or not to execute the rewrite processing of said onboard program, said server checks the vehicle condition data of said vehicle, and when contents of the vehicle condition data indicate that said vehicle is located at a specified position, said server executes the rewrite processing.

18. The system according to claim 13, wherein when said server determines, whether or not to execute the rewrite processing of said onboard program, said server compares the memory content of said onboard controller and a memory content of a master file, and checks the vehicle condition data of said vehicle, and when contents of the vehicle condition data indicate that said vehicle is located at a specified position, said server executes the rewrite processing.

19. The apparatus according to claim 1, wherein the rewriting of the onboard program is controlled by a server that is separate from the vehicle and that is connected thereto by a communication system.

* * * * *